(12) United States Patent
Arikere et al.

(10) Patent No.: US 12,311,948 B2
(45) Date of Patent: *May 27, 2025

(54) VEHICLE MOTION MANAGEMENT SYSTEM AND A MOTION SUPPORT SYSTEM FOR A VEHICLE

(71) Applicant: Volvo Truck Corporation, Gothenburg (SE)

(72) Inventors: Adithya Arikere, Gothenburg (SE); Ray Sidhant, Gothenburg (SE); Leo Laine, Härryda (SE); Leon Henderson, Härryda (SE); Mattias Åsbogård, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,451

(22) Filed: Oct. 26, 2021

(65) Prior Publication Data

US 2022/0135040 A1 May 5, 2022

(30) Foreign Application Priority Data

Nov. 4, 2020 (EP) ..................................... 20205699

(51) Int. Cl.
*B60W 30/18* (2012.01)
*B60W 10/08* (2006.01)
*B60W 40/101* (2012.01)

(52) U.S. Cl.
CPC ...... *B60W 30/18172* (2013.01); *B60W 10/08* (2013.01); *B60W 40/101* (2013.01);
(Continued)

(58) Field of Classification Search
CPC .......... B60W 30/18172; B60W 10/08; B60W 40/101; B60W 2520/26; B60W 2520/28; B60W 2720/30
See application file for complete search history.

(56) References Cited

U.S. PATENT DOCUMENTS

| 5,275,474 A | | 1/1994 | Chin et al. | |
| 6,089,681 A | * | 7/2000 | Watanabe | ................. B60T 8/58 303/113.5 |

(Continued)

FOREIGN PATENT DOCUMENTS

| CN | 104228609 A | 12/2014 |
| CN | 105751919 A | 7/2016 |

(Continued)

OTHER PUBLICATIONS

"Osinenko, P et al.; Optimal slip control for tractors with feedback of drive torque; May 28, 2014; Technische Universität Dresden" (Year: 2014).*

(Continued)

*Primary Examiner* — Elaine Gort
*Assistant Examiner* — Christopher R Cardimino
(74) *Attorney, Agent, or Firm* — Withrow & Terranova, PLLC

(57) ABSTRACT

The present disclosure relates to a vehicle motion management system as well as a motion support system for a vehicle. The vehicle motion management system and the motion support system are arranged to control operation of at least one actuator configured to apply a torque to at least one wheel of the vehicle. The vehicle motion management system is configured to transmit a control signal indicative of a desired torque and a wheel speed limit to the motion support system, whereby the motion support system is, based on the received signal, configured to transmit an actuator signal to the actuator for the actuator to generate an (Continued)

operating torque on the at least one wheel without exceeding an actuator rotational speed limit.

10 Claims, 4 Drawing Sheets

(52) U.S. Cl.
CPC ..... *B60W 2300/12* (2013.01); *B60W 2520/26* (2013.01); *B60W 2520/28* (2013.01); *B60W 2720/30* (2013.01)

(56) References Cited

U.S. PATENT DOCUMENTS

| | | | | |
|---|---|---|---|---|
| 6,542,806 | B1 * | 4/2003 | Suhre | B60W 30/18 701/82 |
| 7,192,374 | B2 * | 3/2007 | Kuras | F16H 63/50 475/153 |
| 7,957,881 | B2 * | 6/2011 | Itoh | B60T 8/175 701/87 |
| 8,825,333 | B2 * | 9/2014 | Okubo | B60T 8/172 303/163 |
| 9,463,697 | B1 * | 10/2016 | Gauthier | B60L 15/20 |
| 9,610,954 | B2 * | 4/2017 | Bird | B60W 10/18 |
| 9,637,001 | B2 * | 5/2017 | Gao | B60K 28/16 |
| 10,029,677 | B2 * | 7/2018 | Owen | B60W 30/02 |
| 10,328,914 | B2 * | 6/2019 | Kerber | B60W 50/0098 |
| 2018/0362022 | A1 | 12/2018 | Kasaiezadeh Mahabadi et al. | |
| 2019/0322256 | A1 | 10/2019 | Tha | |
| 2020/0262468 | A1 | 8/2020 | George et al. | |
| 2021/0370779 | A1 * | 12/2021 | Ford | B60L 3/108 |

FOREIGN PATENT DOCUMENTS

| | | | |
|---|---|---|---|
| CN | 107253451 | A | 10/2017 |
| DE | 102015102925 | A1 | 9/2015 |
| EP | 3398825 | A1 | 11/2018 |
| GB | 201404444 | A | 9/2015 |
| JP | H02310158 | A * | 12/1990 |
| JP | 2651937 | B2 * | 9/1997 |
| JP | H-11310144 | A * | 11/1999 |
| JP | 5768865 | B2 * | 8/2015 |
| SE | 0950446 | A1 | 12/2010 |
| WO | 2011002348 | A1 | 1/2011 |
| WO | 2014184344 | A1 | 11/2014 |
| WO | 2017215751 | A1 | 12/2017 |
| WO | 2019072379 | A1 | 4/2019 |

OTHER PUBLICATIONS

"Damrongrit, P et. al.; Active Driveline Torque-Management Systems; Aug. 2010; IEEE Control Systems Magazine" (Year: 2010).*

"Jalali, K et. al.; Development of a Fuzzy Slip Control System for Electric Vehicles with In-wheel Motors; Apr. 16, 2012; SAE International" (Year: 2012).*

Pacejka, H., "Tyre and vehicle dynamics," 2012, Elsevier Ltd., 629 pages.

Extended European Search Report for European Patent Application No. 20205699.0, mailed Apr. 12, 2021, 14 pages.

Examination Report for European Patent Application No. 20205699.0, mailed Apr. 22, 2024, 8 pages.

First Office Action for Chinese Patent Application No. 202111274096.7, mailed Mar. 6, 2024, 25 pages.

Second Office Action for Chinese Patent Application No. 202111274096.7, mailed Jul. 18, 2024, 18 pages.

Third Office Action for Chinese Patent Application No. 202111274096.7, mailed Nov. 1, 2024, 19 pages.

Decision of Rejection for Chinese Patent Application No. 202111274096.7, mailed Mar. 5, 2025, 16 pages.

* cited by examiner

VEHICLE MOTION MANAGEMENT SYSTEM AND A MOTION SUPPORT SYSTEM FOR A VEHICLE

RELATED APPLICATION

The present application claims priority to European Patent Application No. 20205699.0, filed on Nov. 4, 2020, and entitled "VEHICLE MOTION MANAGEMENT SYSTEM AND A MOTION SUPPORT SYSTEM FOR A VEHICLE," which is incorporated herein by reference in its entirety.

TECHNICAL FIELD

The present disclosure relates to a vehicle motion management system and a motion support system for a vehicle. The present disclosure also relates to a method as well as a control signal operable by the vehicle motion management system and the motion support system. The present disclosure is applicable to electrically propelled vehicles. Although the disclosure will mainly be directed to a vehicle in the form of a truck using electric machines for propulsion, it may also be applicable for other types of vehicles.

BACKGROUND

In the field of vehicle, in particularly low-, medium- and heavy-duty vehicles commonly referred to as trucks, there is a continuous development with regards to various control functionalities of the vehicle. In particular, the control functionalities intend to improve the drivability of the vehicle, the comfort for the driver, and the safety during operation.

SUMMARY

It is thus an object of the present disclosure to at least partially overcome the above described deficiencies.

According to a first aspect, there is provided a vehicle motion management system for a vehicle, the vehicle motion management system being connectable to a motion support system for communication of control signals therebetween, wherein the vehicle motion management system is configured to determine a desired torque for operating the vehicle at a current vehicle operating condition; determine a wheel slip limit for at least one wheel of the vehicle; determine, based at least on the wheel slip limit, a wheel speed limit for the at least one wheel of the vehicle; and transmit a control signal indicative of the desired torque and the wheel speed limit to the motion support system.

The vehicle motion management system and the motion support system are control systems of the vehicle, where each of the control systems is arranged to execute various control functionalities for controlling operation of the vehicle, in particular for controlling wheel operations. The vehicle motion management system is preferably configured to receive, and to determine wheel parameters on a higher level, i.e. the vehicle motion management system determines a desired torque and wheel slip limit in a more generalized form, whereas the motion support system is arranged as a lower level control system configured to convert the parameters received from the vehicle motion management system to appropriate parameters for an actuator. The motion support system takes current driveline state(s) into account before forwarding an actuator signal to the actuator. The current driveline state may, for example, relate to a current vehicle transmission state, a gear stage for the vehicle transmission or a transmission clutch actuation state.

The desired torque can, for example, be received from an operator of the vehicle pushing the accelerator pedal and/or pushing the brake pedal. The desired torque can also be received from a system autonomously controlling propulsion operation of the vehicle, or from an advanced driver assistance system (ADAS).

The wheel slip limit should be construed as a maximum allowable wheel slip for the at least one wheel during operation. Wheel slip is the relative longitudinal motion between the wheel of the vehicle and the ground surface thereof, i.e. the amount of "skidding". The wheel slip can be determined as a relationship between the longitudinal speed of the wheel and the rotational speed of the wheel taking the wheel radius into account. Accordingly, the wheel speed limit is based on the wheel speed relative to the road surface as seen in a wheel based coordinate system. According to an example embodiment, the vehicle motion management system may be configured to determine a current rotational wheel speed and a current longitudinal wheel speed for at least one of the wheels of the vehicle; and determine a wheel slip for the at least one wheel based on the current rotational wheel speed and the current longitudinal wheel speed.

The present disclosure is based on the insight that by transmitting a control signal indicative of a desired torque in combination with a wheel speed limit to the motion support system, the calculation of wheel slip limit can be executed by the higher level vehicle motion management system. When calculating wheel slip, the denominator in the wheel slip equation consists of the rotational wheel speed of the wheel. In low speed operation of the vehicle, the denominator is thus close to zero, or approaches zero which could result in a source of error when calculating wheel slip. Executing the wheel slip in the higher level vehicle motion management system is thus advantageous as potential inconsistencies in wheel slip calculation by separate motion support systems can be avoided. An improved wheel slip consistency is hereby achieved.

Furthermore, transmitting a control signal indicative of the desired torque and the wheel speed limit to the motion support system is particularly advantageous when operating the vehicle using electric machines, as electric machines are able to be speed- and torque controlled. As opposed to slip control, speed control can also be easier to achieve for e.g. service brakes, since rotation speed is a commonly used output of a tire torque balancing system and does not include any of the non-linearities which is present in a wheel slip equation.

According to an example embodiment, the wheel speed limit may be further based on the desired torque. Hereby, the desired torque, i.e. a torque request, is used for calculating a slip limit which slip limit is used when calculating the wheel speed limit.

According to an example embodiment, the wheel speed limit may comprise an upper wheel speed limit and a lower wheel speed limit. The vehicle motion management system may be further configured to transmit the upper wheel speed limit to the motion support system at least when the desired torque is above zero; and transmit the lower wheel speed limit to the motion support system at least when the desired torque is below zero.

An advantage is that different wheel speed limits can be used in dependence of vehicle acceleration or vehicle deceleration.

According to an example embodiment, the vehicle motion management system may be further configured to determine an offset wheel speed parameter; obtain a signal indicative of a wheel speed for the vehicle; and determine the wheel slip limit based on the offset wheel speed parameter when the wheel speed is below a threshold vehicle speed limit.

The offset wheel speed parameter is advantageously used when the wheel speed is relatively low, such as close to zero. As described above, the wheel slip limit can be difficult to correctly calculate at low speeds due to the denominator of the wheel slip calculation model. Setting an offset wheel speed parameter thus advantageously remedies this potential inconsistency. The offset wheel speed parameter may be an upper offset wheel speed parameter and a lower offset wheel speed parameter, where the upper offset wheel speed parameter is higher than the current vehicle speed, and the lower offset wheel speed parameter is lower than the current vehicle speed. The offset wheel speed parameter can be obtained by using a tire model to map the offset wheel speed parameter to a desired torque.

According to an example embodiment, the wheel slip limit may be within a predetermined wheel slip range. Hereby, the wheel of the vehicle will not be exposed to a too severe wheel slip or a too low wheel slip.

According to an example embodiment, the vehicle motion management system may be further configured to obtain a signal indicative of a current accelerator pedal position of an accelerator pedal of the vehicle; and determine the desired torque based on the current accelerator pedal position. However, and according to an example embodiment, the desired torque may instead be determined based on a signal received from an autonomous vehicle operating system. According to a further alternative as indicated above, the vehicle motion management system may also be configured to obtain a signal indicative of a brake pedal position for determining the desired torque, or from a so-called retarder stalk position of a retarder of the vehicle. The vehicle motion management system can thus be arranged in an autonomously controlled vehicle as well as a driver controlled vehicle.

According to an example embodiment, the vehicle motion management system may be further configured to determine a wheel friction level between the at least one wheel and a road surface; and determine the current vehicle operating condition based on the determined wheel friction level. Other alternatives of determining the current vehicle operating condition. For example, the current weight of the vehicle, i.e. the weight of a laden vehicle, the road topology at which the vehicle is current operated, etc. can also, as alternatives, or in conjunction with the wheel friction level, be used as input parameters when determining the current vehicle operating condition.

According to a second aspect, there is provided a motion support system for a vehicle, the motion support system being connectable to the above described vehicle motion management system and to at least one actuator configured to apply a torque to at least one wheel of the vehicle, wherein the motion support system is configured to receive a control signal from the vehicle motion management system, the control signal being indicative of a desired torque for operating the vehicle at a current vehicle operating condition, and indicative of a wheel speed limit for the at least one wheel of the vehicle; determine a current vehicle driveline state for the vehicle; determine, based on the current vehicle driveline state, the desired torque and the wheel speed limit, an operating torque and an actuator rotational speed limit; and transmit an actuator signal to the actuator for the actuator to generate the operating torque on the at least one wheel without exceeding the actuator rotational speed limit.

The current driveline state should be construed as a current operating mode of the driveline, and in particular the transmission of the driveline. According to an example embodiment, the current vehicle driveline state may be one of a current vehicle transmission state, a gear stage for the vehicle transmission or a transmission clutch actuation state. Hereby, and as indicated above, the motion support system is arranged as a lower level control system configured to convert the parameters received from the vehicle motion management system to appropriate parameters for an actuator taking the current driveline state into consideration.

According to an example embodiment, the motion support system may be a decentralized motion support system connectable to a wheel specific actuator configured to control a single wheel of the vehicle.

Using a decentralized motion support system enables for rapid response to the specific actuator it is connected to, which hence improves the operational propulsion/braking performance of the vehicle. The decentralized can be connected to a separate vehicle motion management system, or connected to a central vehicle motion management system, which central vehicle motion management system is connected to a plurality of decentralized motion support systems.

Further effects and features of the second aspect are largely analogous to those described above in relation to the first aspect. By means of the above described first and second aspects, a vehicle control system is thus provided which comprises the vehicle motion management system as defined by any one of the embodiments of the first aspect, and a motion control system as defined by any one of the embodiments of the second aspect.

According to a third aspect, there is provided a method for controlling an actuator of a vehicle, the actuator being configured to apply a torque on at least one wheel of the vehicle, wherein the method comprises determining a desired torque for operating the vehicle at a current vehicle operating condition; determining a wheel slip limit for the at least one wheel of the vehicle; determining, based at least on the wheel slip limit, a wheel speed limit for the at least one wheel of the vehicle; determining an operating torque and an actuator rotational speed limit based on the desired torque, the wheel speed limit and a current vehicle driveline state; and controlling the actuator to generate the operating torque on the at least one wheel without exceeding the actuator rotational speed limit.

Effects and features of the third aspect are largely analogous to those described above in relation to the first and second aspects. Thus, features described above in relation to the vehicle motion management system as well as the motion support system are applicable to the method described in the third aspect.

According to a fourth aspect, there is provided a control signal representing instructions to be executed by a motion support system, the control signal comprising a torque component enabling the motion support system to determine an operating torque; and a wheel speed limit component representing wheel speed limit data which, when executed by the motion support system, cause the motion support system to generate an actuator signal corresponding to the operation torque subject to an actuator rotational speed limit, which is determinable based on the wheel speed limit component in view of a current vehicle driveline state.

According to a fifth aspect, there is provided a computer program comprising program code means for performing the steps of the above described third aspect when the program is run on a computer.

According to a sixth aspect, there is provided a computer readable medium carrying a computer program comprising program means for performing the steps of the above described third aspect when the program means is run on a computer.

Effects and features of the fourth, fifth and sixth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
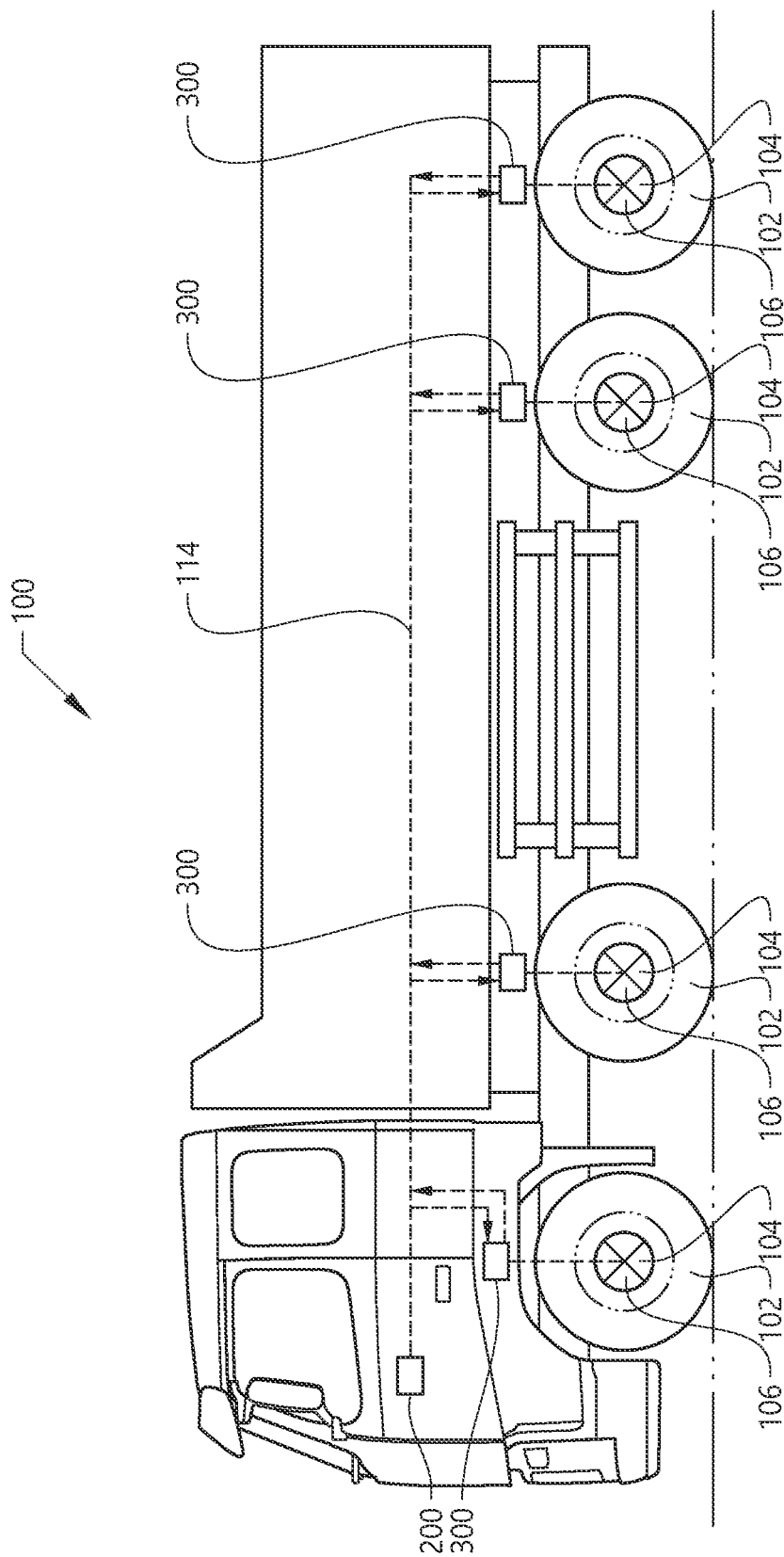
FIG. 1 is a lateral side view illustrating an example embodiment of a vehicle in the form of a truck.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 3:
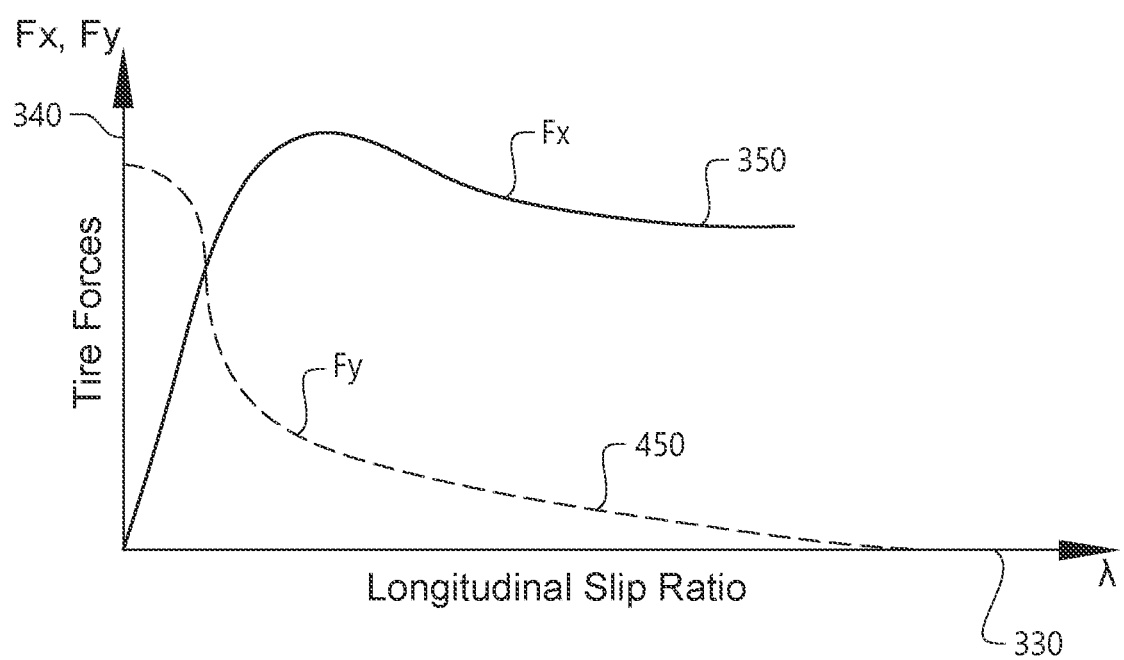
FIG. 3 is a graph illustrating an example embodiment of a model representing a relationship between wheel slip and tire forces.

With particular reference to FIG. 1, there is depicted a vehicle 100 in the form of a truck. The vehicle comprises a plurality of wheels 102, wherein each of the wheels 102 comprises a respective actuator 104. Although the embodiment depicted in FIG. 1 illustrates an actuator for each of the wheels 102, it should be readily understood that e.g. one pair of wheels 102 may be arranged without such an actuator 104. Further, the actuators 104 are preferably actuators for controlling a respective wheel propulsion device, such as an electric machine 106 arranged to e.g. provide a tire force to the wheel(s) of the vehicle 100, as depicted in FIG. 3 and described further below. Such an electric machine may thus be adapted to generate a propulsion torque as well as arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective motion support system 300 arranged for controlling operation of the actuator 104. The motion support system 300 is preferably a decentralized motion support system 300, although centralized implementations are also possible. It is furthermore appreciated that some parts of the motion support system may be implemented no processing circuitry remote from the vehicle, such as on a remote server accessible from the vehicle via wireless link. Still further, each motion support system 300 is connected to a vehicle motion management system 200 of the vehicle 100 via a data bus communication arrangement 114 or the like. Hereby, control signals can be transmitted between the vehicle motion management system 200 and the motion support system 300. The vehicle motion management system 200 and the motion support system 300 will be described in further detail below with reference to FIG. 2.

The vehicle motion management system 200 as well as the motion support system 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device.

Figure 2:
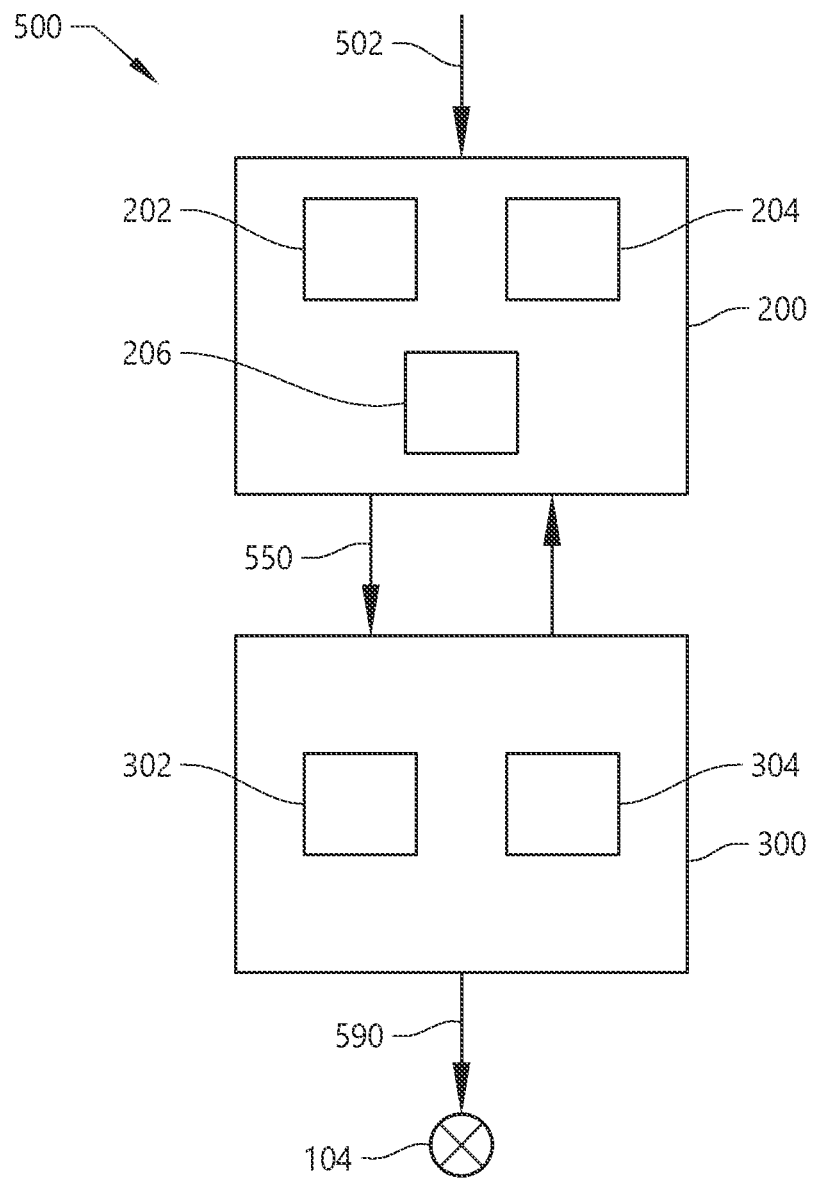
FIG. 2 is a schematic illustration of a vehicle motion management system and a motion support system according to an example embodiment.

Turning to FIG. 2 which is a schematic illustration of the vehicle motion management system 200 and the motion support system 300 according to an example embodiment. The vehicle motion management system 200 and the motion support system 300 thus form part of a vehicle motion system 500.

The overall vehicle control system may be implemented on one or more vehicle unit computers (VUC). The VUC may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

FIG. 2 schematically illustrates functionality for controlling one or more wheels by some example motion support devices (MSDs), such as a friction brake and a propulsion device. The friction brake and the propulsion device are examples of wheel torque generating devices, which may also be referred to as actuators and which can be controlled by one or more motion support device control units. The control is based on, e.g., measurement data obtained from a wheel speed sensor and from other vehicle state sensors, such as radar sensors, lidar sensors, and vision based sensors such as camera sensors and infra-red detectors. Other example torque generating motion support devices which may be controlled according to the principles discussed herein comprise engine retarders and power steering devices. An MSD control unit may be arranged to control one or more actuators. For instance, it is not uncommon that an MSD control unit is arranged to control both wheel on a given axle.

The TSM function plans driving operation with a time horizon of, e.g., 10 seconds or so. This time frame corresponds to, e.g., the time it takes for the vehicle to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles areq and curvature profiles creq from the VMM function which performs force allocation to meet the requests from the TSM in a safe and robust manner.

Acceleration profiles and curvature profiles may also be obtained from a driver of the heavy duty vehicle via normal control input devices such as a steering wheel, accelerator pedal and brake pedal.

The VMM function operates with a time horizon of about 1 second or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The VMM function performs vehicle state or motion estimation, i.e., the VMM function continuously determines a vehicle state comprising positions, speeds, accelerations and articulation angles of the different units in the vehicle combination by monitoring operations using various sensors arranged on the vehicle 100, often but not always in connection to the MSDs.

The result of the motion estimation, i.e., the estimated vehicle state(s), may be input to a force generation module which determines the required global forces for the different vehicle units to cause the vehicle 100 to move according to the requested acceleration and curvature profiles $a_{req}$, $c_{req}$. The required global force vector is input to an MSD coordination function which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination.

By determining vehicle unit motion using, e.g., global positioning systems, vision-based sensors, wheel speed sensors, radar sensors and/or lidar sensors, and translating this vehicle unit motion into a local coordinate system of a given wheel (in terms of, e.g., longitudinal and lateral velocity components), it becomes possible to accurately estimate wheel slip by comparing the vehicle unit motion in the wheel reference coordinate system to data obtained from the wheel speed sensor arranged in connection to the wheel.

A tyre model, which will be discussed in more detail in connection to FIG. 3 below, can be used to translate between a desired longitudinal tire force $Fx_i$ and wheel slip. Wheel slip relates to a difference between wheel rotational velocity and speed over ground and will be discussed in more detail below. Wheel speed is a rotational speed of the wheel, given in units of, e.g., rotations per minute (rpm) or angular velocity in terms radians/second (rad/s) or degrees/second (deg/s).

Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, the VMM function manages both force generation and MSD coordination, i.e., it determines what forces that are required at the vehicle units in order to fulfil the requests from the TSM function, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The VMM is arranged as a higher layer control system, while the MSD is arranged as a lower layer control system. The higher layer VMM 200 is thus arranged to determine various parameters, as will be described below, in the vehicle/wheel domain, i.e. based on an overall vehicle condition, such as vehicle speed. The lower layer MSD 300 on the other hand is arranged to determine parameters which are specific for the actuator connected to the wheel. The lower layer MSD thus transform the signals received from the higher layer VMM into the actuator domain taking into account e.g. gear ratio, driveline inertia, etc.

According to a non-limiting example, the vehicle motion management system 200 comprises a torque module 202, a wheel slip module 204 and a friction module 206. The vehicle motion management system 200 is further arranged to receive vehicle operation signal(s) 502 which comprises data operable by the vehicle motion management system 200 and its various modules 202, 204, 206. The vehicle operation signal(s) 502 provided to the vehicle motion management system 200 may, for example, comprises data in the form of signal(s) indicative of a current environment of the vehicle, a current traffic situation, vehicle weight parameter, such as e.g. if the vehicle is laden, unladen, partially laden, etc. The vehicle motion management system 200 may also receive other signals indicative of specific vehicle conditions, such as e.g. a current vehicle operating condition as will be described below. The torque module 202, the wheel slip module 204 and the friction module 206 are configured to transmit communication signals between one another, i.e. the different modules are configured to communicate with each other as will be evident by the following disclosure. It should be readily understood that the torque module 202, the wheel slip module 204 and the friction module 206 are illustrated as separate components merely for illustrative purposes. The vehicle motion management system 200 may of course also simply comprise various control functionalities itself which executes the below described functionalities.

The following will now describe the functional operation of the vehicle motion management system 200. In particular, the vehicle motion management system 200 is arranged to receive an input signal with information relating to a current vehicle operating condition. The current vehicle operating condition may, for example, comprise data indicative of a wheel friction level between the wheel of the vehicle and the road surface, or the current weight of the vehicle, i.e. if the vehicle is unladen, laden or partially laden, or the topology of the road at which the vehicle is presently operating. The various operating conditions may thus be received by the vehicle motion management system 200 as individual components, or as a component using all different operating conditions as an overall vehicle operating condition. The different operating conditions for the vehicle can be determined using suitable sensor(s) and transmitted to the vehicle motion management system 200.

As is described above, the vehicle motion management system 200 further comprises the friction module 206. According to an example embodiment, the vehicle motion management system 200 is arranged to, using the friction module 206, determine a wheel friction level between the at least one wheel and the road surface. The vehicle motion management system 200 can determine the current vehicle operating condition based on the determined wheel friction level.

The torque module 202 is adapted to determine a desired torque for operating the vehicle at the current vehicle operating condition. Hereby, the vehicle motion management system 200 determines a torque request, in the above described higher layer vehicle motion management system 200, for properly controlling the vehicle 100 at the current operating condition.

The desired torque may, for example, be determined based on a current accelerator pedal position, a brake pedal position, or based on a signal received from an autonomous vehicle operating system.

The wheel slip module 204 is arranged to determine a wheel slip limit for at least one wheel 102 of the vehicle 100. Thus, a maximum allowable wheel slip for the vehicle is determined, where the wheel of the vehicle is not allowed to exceed such wheel slip limit. Wheel slip can, as a non-limiting example, be determined based on below equation (1):

$$\lambda = \frac{\omega_w R_w - V_{x,w}}{\max(|\omega_w R_w|, |V_{x,w}|)} \quad (1)$$

Where:
$\lambda$ is the wheel slip for the wheel;
$\omega_w$ is the rotational velocity of the wheel;
$R_w$ is the wheel radius; and
$V_{x,w}$ is the longitudinal wheel speed of the wheel.

The wheel slip limit can be determined by using e.g. the model 350 described below in relation to FIG. 3. The vehicle motion management system 200 can hereby convert a force request into a slip request, whereby a slip limit is set based on the slip request. According to another example, the slip limit can be set as a fixed value independently on the force request. The slip limit may also be based on a signal indicative of a current friction level between the road surface and the surface of the tire.

Based on the wheel slip limit, the wheel slip module 204 is configured to determine a wheel speed limit for the at least one wheel. Hereby, the vehicle motion management system 200 executes the wheel slip limit calculations and the wheel speed limit calculations. According to a non-limiting example, the wheel speed limit, $\omega_{w,sl}$, can be determined based on below equation (2):

$$\omega_{w,sl} = \begin{cases} \dfrac{|V_{x,w}|\lambda_{lim} + V_{x,w}}{R_w}, & \lambda_{lim} \leq 0 \text{ and/or } T_{req} \leq 0 \\ \dfrac{V_{x,w}}{R_w(1 - \lambda_{lim})}, & \lambda_{lim} > 0 \text{ and/or } T_{req} > 0 \end{cases} \quad (2)$$

Where:
$\lambda_{lim}$ is the wheel slip limit; and
$T_{req}$ is the desired torque.

In the event the wheel speed is relatively low, i.e. close to zero, the vehicle motion management system 200 can be arranged to determine a wheel slip based on an offset wheel speed parameter, whereby an offset wheel speed limit can be calculated according to the below non-limiting equation (3):

$$\omega_{w,ol} = V_{x,w}/Rw + \max(|\lambda_{lim}|k_{ol},\omega_{w,ol,max})sgn(\lambda) \quad (3)$$

Where:

$\omega_{w,ol}$ is the wheel speed limit calculated from the speed offset limit;
$k_{ol,\omega}$ and $\omega_{ol,max}$ are gain and maximum speed offset parameters used for transforming the slip limit to an offset limit; and
$sgn(\lambda)$ is a signum function which equals 1 during acceleration, and −1 during deceleration.

Moreover, the wheel speed limit may also comprise an upper wheel speed limit and a lower wheel speed limit, where the upper wheel speed is used during acceleration, i.e. during propulsion, and the lower wheel speed limit is used during deceleration, i.e. during braking. The upper wheel speed limit is used when the wheel slip limit is positive and the desired torque is above zero, i.e. during acceleration, while the lower wheel speed limit is used when the wheel slip limit is negative and the desired torque is below zero, i.e. during deceleration. Also, the wheel slip limit is within a predetermined range defined as:

$$-1 < \lambda_{lim} < 1$$

The characteristics of the wheel slip relative to the longitudinal and transversal tire forces is depicted in FIG. 3. Thus, FIG. 3 illustrates a model 350 representing the relationship between the calculated longitudinal wheel slip and the estimated longitudinal wheel force values, while the model 450 represents the relationship between the maximum available lateral wheel forces for a given longitudinal wheel slip. The model 450 can also, for a predetermined lateral slip angle of the tire, represent the achieved lateral wheel force for a given longitudinal wheel slip. The vertical axis 340 represents the tire force generated between the surface supporting the wheel 102 and the wheel, while the horizontal axis 330 represents the longitudinal wheel slip of the wheel 102 as defined above in Eqn (1).

Referring back to FIG. 2, when the wheel speed limit and the desired torque have been determined, the vehicle motion management system 200 transmits a control signal 550 to the motion support system 300, wherein the control signal is indicative of the desired torque and the wheel speed limit.

The motion support system 300 in turn comprises a driveline state module 302 and an actuator torque module 304. In a similar vein as described above in relation to the vehicle motion management system 200, the driveline state module 302 and the actuator torque module 304 are merely depicted as separate components for illustrative purposes. The motion support system 300 may of course also simply comprise various control functionalities itself which executes the below described functionalities.

As has been described above, the motion support system 300 receives the control signal 550 from the vehicle motion management system 200. The driveline state module 302 determines a current driveline state for the vehicle 100. The current driveline state can, for example, relate to a current vehicle transmission state, a gear stage for the vehicle transmission, a transmission clutch actuation state, etc.

The actuator torque module 304 is configured to determine an actuator specific torque, i.e. converts data of the desired torque from the vehicle motion management system 200 into data relevant for the actuator 104. In particular, the actuator torque module 304 determines an operating torque based on the desired torque received from the vehicle motion management system 200 as well as based on the current driveline state of the vehicle 100.

The actuator torque module 304, also determines an actuator rotational speed limit for the actuator 104. The actuator rotational speed limit is based on the wheel speed limit received from the vehicle motion management system

200. The actuator rotational speed limit may also be based on the current driveline state. Hereby, the motion support system 300 has converted the wheel speed limit received from the vehicle motion management system 200 to a wheel specific rotational wheel speed limit.

The motion support system 300 thereafter transmits an actuator control signal 590 to the actuator 104 to generate the operating torque on the wheel 102 without exceeding the actuator rotational speed limit.

Figure 4:
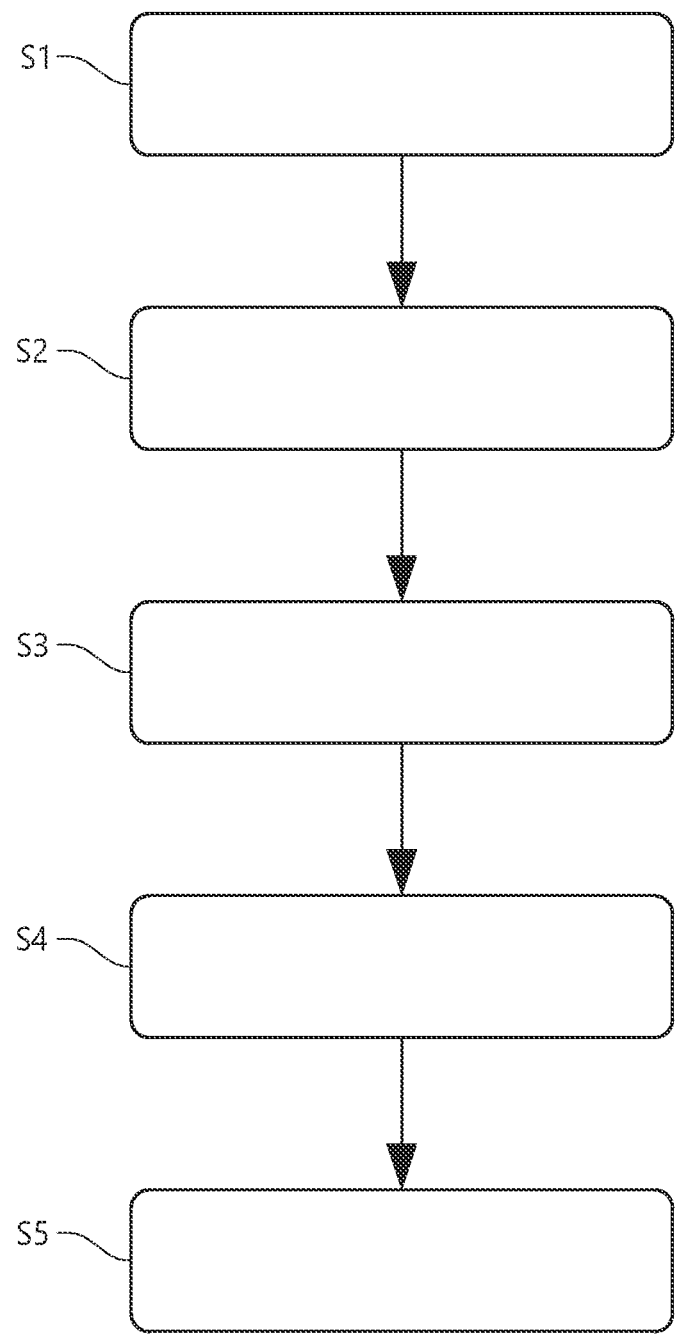
FIG. 4 is a flow chart of a method for controlling an actuator of the vehicle in FIG. 1 according to an example embodiment.

To sum up, reference is made to FIG. 4 which shows a flow chart of a method for controlling the actuator 104 of the vehicle 100 according to an example embodiment. During operation of the vehicle 100, a desired torque for operating the vehicle 100 at a current vehicle operating condition is determined S1. As described above, the desired torque may be determined based on an input signal from an accelerator pedal of the vehicle 100, or from an autonomous vehicle operating system, or from some advanced driver assistance system (ADAS) implemented in the vehicle 100.

The current vehicle operating condition may comprise data indicative of a wheel friction level between the wheel of the vehicle and the road surface, the current weight of the vehicle, the topology of the road at which the vehicle is presently operating, and so on, as discussed above.

Also, a wheel slip limit is determined S2, and based on the determined wheel slip limit, a wheel speed limit for the at least one wheel 102 is determined S3. Based on the desired torque, the wheel speed limit and a current vehicle driveline state, an operating torque and an allowed actuator rotational speed range can be determined S4. Hereby, actuator specific parameters are determined.

Finally, the actuator is controlled S5 to generate the operating torque on the at least one wheel 102 without exceeding the actuator rotational speed limit. Thus, as long as the actuator rotational speed is kept within the allowable range, torque control is allowed to generate the operating torque.

It is to be understood that the present disclosure is not limited to the embodiments described above and illustrated in the drawings; rather, the skilled person will recognize that many changes and modifications may be made within the scope of the appended claims.

The invention claimed is:

1. A vehicle motion management system for a vehicle, the vehicle motion management system being connectable to a motion support system coupled with at least one actuator configured to apply a torque to at least one wheel of the vehicle, for communication of control signals between the vehicle motion management system and the motion support system, wherein the vehicle motion management system is configured to:
   determine a desired torque for operating the vehicle at a current vehicle operating condition;
   determine an offset wheel speed parameter;
   obtain a signal indicative of a wheel speed for the vehicle;
   determine a wheel slip limit for the at least one wheel of the vehicle based on the offset wheel speed parameter when the wheel speed is less than a threshold vehicle speed limit;
   determine, based at least on the wheel slip limit and the desired torque, a wheel speed limit for the at least one wheel of the vehicle, wherein the wheel speed limit comprises an upper wheel speed limit and a lower wheel speed limit;
   transmit a control signal indicative of the desired torque to the motion support system for use in controlling the at least one actuator to apply the torque to the at least one wheel of the vehicle;
   transmit only the upper wheel speed limit to the motion support system when the desired torque is greater than zero;
   transmit only the lower wheel speed limit to the motion support system when the desired torque is less than zero; and
   control the actuator to generate the desired torque on the at least one wheel.

2. The vehicle motion management system of claim 1, wherein the vehicle motion management system is further configured to:
   determine a current rotational wheel speed and a current longitudinal wheel speed for at least one wheel of a plurality of wheels of the vehicle; and
   determine a wheel slip for the at least one wheel based on the current rotational wheel speed and the current longitudinal wheel speed.

3. The vehicle motion management system of claim 1, wherein the wheel slip limit is within a predetermined wheel slip range.

4. The vehicle motion management system of claim 1, wherein the vehicle motion management system is further configured to:
   obtain a signal indicative of a current accelerator pedal position of an accelerator pedal of the vehicle; and
   determine the desired torque based on the current accelerator pedal position.

5. The vehicle motion management system of claim 1, wherein the desired torque is determined based on a signal received from an autonomous vehicle operating system.

6. The vehicle motion management system of claim 1, wherein the vehicle motion management system is further configured to:
   determine a wheel friction level between the at least one wheel and a road surface; and
   determine the current vehicle operating condition based on the determined wheel friction level.

7. A motion support system for a vehicle, the motion support system being connectable to a vehicle motion management system and to at least one actuator configured to apply a torque to at least one wheel of the vehicle, wherein the motion support system is configured to:
   receive a control signal from the vehicle motion management system, the control signal being indicative of a desired torque for operating the vehicle at a current vehicle operating condition, and the control signal being further indicative of a wheel speed limit for the at least one wheel of the vehicle, the wheel speed limit comprising an upper wheel speed limit received from the vehicle motion management system only when the desired torque is greater than zero, and a lower wheel speed limit received from the vehicle motion management system only when the desired torque is less than zero, the control signal being further indicative of an offset wheel speed parameter when a wheel speed for the vehicle is less than a threshold vehicle speed limit;
   determine a current vehicle driveline state for the vehicle;
   determine, based on the current vehicle driveline state, the desired torque and the wheel speed limit, an operating torque, and an actuator rotational speed limit; and
   control the at least one actuator to generate the operating torque on the at least one wheel without exceeding the actuator rotational speed limit.

8. The motion support system of claim 7, wherein the current vehicle driveline state is one of a current vehicle transmission state, a gear stage for a vehicle transmission, or a transmission clutch actuation state.

9. The motion support system of claim 7, wherein the motion support system is a decentralized motion support system connectable to a wheel specific actuator configured to control a single wheel of the vehicle.

10. A method for controlling an actuator of a vehicle, the actuator being configured to apply a torque on at least one wheel of the vehicle, wherein the method comprises:
   determining a desired torque for operating the vehicle at a current vehicle operating condition;
   determining an offset wheel speed parameter;
   obtaining a signal indicative of a wheel speed for the vehicle based on the offset wheel speed parameter when the wheel speed is less than a threshold vehicle speed limit;
   determining a wheel slip limit for the at least one wheel of the vehicle;
   determining, based at least on the wheel slip limit and the desired torque, a wheel speed limit for the at least one wheel of the vehicle, wherein the wheel speed limit comprises an upper wheel speed limit determined only when the desired torque is greater than zero, and a lower wheel speed limit determined only when the desired torque is less than zero;
   determining an operating torque and an actuator rotational speed limit based on the desired torque, the wheel speed limit, and a current vehicle driveline state; and
   controlling the actuator to generate the operating torque on the at least one wheel without exceeding the actuator rotational speed limit.

* * * * *